United States Patent
Wang et al.

(10) Patent No.: US 12,329,135 B1
(45) Date of Patent: Jun. 17, 2025

(54) **DEVICE AND USE METHOD FOR WILD *MONOPTERUS ALBUS* DOMESTICATION**

(71) Applicant: Suqian Institute of Agricultural Sciences, Jiangsu Academy of Agricultural Sciences, Suqian (CN)

(72) Inventors: Xuanpeng Wang, Suqian (CN); Yongchun Ge, Suqian (CN); Gaowei Zhang, Suqian (CN); Hanlin Zhou, Suqian (CN)

(73) Assignee: Suqian Institute of Agricultural Sciences, Jiangsu Academy of Agricultural Sciences, Suqian (CN)

( * ) Notice: Subject to any disclaimer, the term of this patent is extended or adjusted under 35 U.S.C. 154(b) by 0 days.

(21) Appl. No.: 19/021,777

(22) Filed: Jan. 15, 2025

(30) Foreign Application Priority Data

Mar. 19, 2024 (CN) .......................... 202410315532.8

(51) Int. Cl.
*A01K 61/17* (2017.01)
*A01K 63/04* (2006.01)
*A01K 63/06* (2006.01)

(52) U.S. Cl.
CPC ............ *A01K 61/17* (2017.01); *A01K 63/042* (2013.01); *A01K 63/065* (2013.01)

(58) Field of Classification Search
USPC ....... 119/217, 200, 201, 215, 221, 245, 246, 119/247, 252, 254, 261, 263, 268, 269, 119/6.7
See application file for complete search history.

(56) References Cited

FOREIGN PATENT DOCUMENTS

| CN | 103299941 A | | 9/2013 | |
|----|----|----|----|----|
| CN | 104823908 | * | 8/2015 | ............ A01K 63/00 |
| CN | 206118829 U | | 4/2017 | |
| CN | 109006589 A | | 12/2018 | |
| CN | 110839569 A | | 2/2020 | |
| CN | 11567470 | * | 8/2020 | ............ A01K 63/04 |
| CN | 112586409 | * | 4/2021 | ............ A01K 61/10 |
| CN | 213187698 U | | 5/2021 | |
| JP | 62061527 | * | 3/1987 | ............ A01K 61/00 |

OTHER PUBLICATIONS

Retrieval report—First search dated Sep. 23, 2024 in SIPO application No. 202410315532.8, dated Mar. 19, 2024 appears, but date of Sep. 23, 2024 is not found on the document.
Notification to Grant Patent Right for Invention dated Nov. 14, 2024 in SIPO application No. 202410315532.8.
Notice of first Office action dated Sep. 26, 2024 in SIPO application No. 202410315532.8.

* cited by examiner

*Primary Examiner* — Andrea M Valenti
(74) *Attorney, Agent, or Firm* — Pilloff Passino & Cosenza LLP; Rachel Pilloff; Sean Passino

(57) ABSTRACT

A device for wild *Monopterus albus* domestication includes a circular water tank, the circular water tank is placed on a bracket, a groove is arranged in the circular water tank, a drainpipe is arranged in the groove, a plug is detachably connected to the drainpipe, the plug extends out of the circular water tank, the plug passes through the bracket, a water inlet pipe is fixedly connected to the circular water tank, a valve is installed on the water inlet pipe, a water grass fixing frame is placed in the circular water tank, a material table is arranged in the circular water tank, a water quality monitoring instrument is placed in the circular water tank, multiple bubble stones and a heating rod are placed in the circular water tank, a hose is communicated with the bubble stones.

1 Claim, 3 Drawing Sheets

DEVICE AND USE METHOD FOR WILD *MONOPTERUS ALBUS* DOMESTICATION

CROSS-REFERENCE TO RELATED APPLICATIONS

This application claims priority to Chinese Patent Application No. 202410315532.8, filed on Mar. 19, 2024, the contents of which are hereby incorporated by reference.

TECHNICAL FIELD

The present disclosure relates to the technical field of *Monopterus albus* domestication, in particular to a device and a use method for wild *Monopterus albus* domestication.

BACKGROUND

The *Monopterus albus*, also known as eel, belongs to Actinopterygii Synbranchiformes—the genus *Monopterus*, which is a freshwater benthic omnivorous fish with animal bait as the main food. The *Monopterus albus* is widely distributed in China, mainly inhabiting muddy waters such as paddy fields, lakes, ponds, rivers and ditches. The *Monopterus albus* meat is tender, delicious, nutritious and has certain medicinal value, so the *Monopterus albus* has great consumption demand in China. The domestic market is in short supply of the *Monopterus albus*, which is caught in large quantities in various producing areas, making the wild *Monopterus albus* resources in China increasingly scarce, and artificial large-scale breeding is imminent. The artificial propagation technology of the *Monopterus albus* has made a breakthrough, but the technology may not meet the growing needs of breeding in a short term, and offspring seeds still rely on wild sources.

At present, a survival rate of wild offspring seeds domestication is the key to restrict the healthy development of the *Monopterus albus* industry. Domestication scenes, seed sources, treatment methods and bait compositions are all factors that affect the survival rate of wild offspring seeds domestication.

In the prior art, there are problems of large occupied space and low domestication survival rate, and there are relatively few offspring seeds domestication devices integrating functions of wild *Monopterus albus* offspring seeds disposal, temporary breeding, domestication, breeding, etc. In the prior art with the application number CN201810816285.4, a device and a method for artificially domesticating and cultivating wild *Monopterus albus* offspring seeds in advance are provided, including a reservoir, a heating pool, a cultivation pool and a sewage pool which are communicated in sequence, but the device has poor integration and is complicated to construct.

Therefore, a device and a use method for wild *Monopterus albus* domestication are proposed to solve the above problems.

SUMMARY

A purpose of the present application is to provide a device and a use method for wild *Monopterus albus* domestication, so as to solve the problems existing in the prior art.

In order to achieve the above purpose, the present application provides the following scheme: the present application provides a device for wild *Monopterus albus* domestication, including:

a circular water tank, the circular water tank is placed on a bracket, a groove is arranged in the circular water tank, a drainpipe is arranged in the groove, a plug is detachably connected to the drainpipe, the plug extends out of the circular water tank, the plug passes through the bracket, a water inlet pipe is fixedly connected to the circular water tank, a valve is installed on the water inlet pipe, a water grass fixing frame is placed in the circular water tank, a material table is arranged in the circular water tank, a water quality monitoring instrument is placed in the circular water tank, multiple bubble stones and a heating rod are placed in the circular water tank, a hose is communicated with the bubble stones, an aerator is communicated with one end of the hose far away from the bubble stones, and an imitating ecological *Monopterus albus* nest and multiple volcanic rocks are placed in the circular water tank.

Preferably, the imitating ecological *Monopterus albus* nest is a PVC material wave-shaped horizontal stripe square piece; the method includes the following steps:

S1, device preparation: firstly, all parts of the domestication device are assembled, the domestication device is disinfected by potassium permanganate solution, then the *Pistia stratiotes* L. is transplanted into the water grass fixing frame, and the *Pistia stratiotes* L. covers half of the water surface.

S2, stocking method: introducing running water into the circular water tank, and keeping a water level at 0.7-0.9 m and pH at 7.0-7.5; adding anti-stress nutrients; according to 50-100 eels/m$^2$ water body, the *Monopterus albus* offspring seeds with specifications of 8-15 g/eels should be stocked, and the *Monopterus albus* offspring seeds should be disease-free, injury-free, with complete mucus and neat specifications, and come from the local area; the *Monopterus albus* offspring seeds should be caught in professional *Monopterus albus* cages within 48 hours and tested for epidemic diseases, without long-term storage, transportation, electric shock, or drug anesthesia; when the offspring seeds are released, the *Monopterus albus* offspring seeds are placed in a special frame beside the circular water tank for 5 minutes, then the offspring seeds are soaked in the circular water tank for 3 times, lasting for 15 seconds, 20 seconds and 60 seconds respectively, and finally the offspring seeds are poured into water.

S3, disposal method: after pouring the *Monopterus albus* offspring seeds into the water in the circular water tank for 3 days, observing the death of the *Monopterus albus* offspring seeds, picking out the dead offspring seeds, turning on the heating rod, raising the temperature slowly, and the temperature is stopped for 1 hour every 2° C. rise until the temperature is raised to 32° C. for 7 days; on the fourth day after the offspring seeds are released, the earthworm is fed according to 1.5-3% of the weight of the *Monopterus albus* offspring seeds, once a day and at night every time, and the earthworm is placed on the material table when feeding; feeding fresh earthworm on the fourth to sixth day after offspring seeds are released, and feeding chopped fresh earthworm on the seventh to tenth day; insect repellent and bactericidal drugs are put on the twelfth day after offspring seeds are released for three days.

S4, feed-switching domestication: feed-switching domestication is started on the thirteenth day after the offspring seeds are released, and chopped mixed commercial feed of earthworm is used to form a domestication material for domestication, and the domestication lasts for 10 days.

S5, micro-ecological construction: after domestication, 1.5 kg of clean and fresh snails and 1.5 kg of shellfish are put into the circular water tank, and 0.2 g/L of *Bacillus* is used regularly.

Preferably, the circular water tank is made of glass fiber reinforced plastic or food-grade PVC, with a diameter of 2 m and a depth of 1 m, a smooth inner wall and a black color.

Preferably, the mass fraction of the potassium permanganate solution in the S1 is 15-25%, and the volume of the circular water tank is 3.14 m$^3$.

Preferably, in the S1, 5-8 stems and leaves of the *Pistia stratiotes* L. are tender green, the root system is intact, there is no insect, and there is no withering and yellow.

Preferably, the formula of the anti-stress nutrients in the S2 is: 3-5 g of sucrose, 1-5 g of vitamin C, 2-3 g of houttuynia cordata and 3-5 g of licorice per liter of water.

Preferably, the detection of epidemic diseases in the S2 includes the detection of pathogenic microorganisms, and the detection method adopts randomly selecting the microorganisms on the surface of the *Monopterus albus* offspring seeds, the environment and the means of transportation, and carrying out microbial culture and sequencing judgment.

Preferably, the dosage of the insect repellent and bactericidal drugs in the S3 is 0.05-1 g of neem leaves and 0.01-0.02 g of dried pomegranate peel per liter of water.

Preferably, the preparation method of the domestication material described in the S4 includes the following steps: mixing and pulverizing the chopped earthworm into powder commercial material, adding water, stirring into dough coagulated but not dispersed, and adding taurine according to 0.2-0.8% of the weight of the domestication material; and the weight ratio of the earthworm to the commercial material is 4:1, 2:1, 1:1, 1:2, 1:4 and 0:5 in sequence, and is adjusted every two days.

The application provides following technical effects: in the device for wild *Monopterus albus* domestication, the bracket is used for supporting the circular water tank, the drainpipe is used for discharging the water in the circular water tank, the water inlet pipe is used for adding water into the circular water tank, the water grass fixing frame is used for fixing the *Pistia stratiotes* L., the water quality monitoring instrument is put into the water through a cable, the strength of the cable meets the use requirements, the water quality monitoring instrument is used for monitoring the water quality, and the aerator blows air into the water through a hose to increase the oxygen in the water, and there are multiple imitating ecological *Monopterus albus* nests. The key technical parameters such as the sources, stocking specifications, stocking density, micro-ecological construction, disposal methods and so on of the *Monopterus albus* offspring seeds are specified in the use method for the device for wild *Monopterus albus* domestication, so as to improve the domestication survival rate of the wild *Monopterus albus*, reduce the offspring seeds cost and realize an indoor industrial breeding of the *Monopterus albus*.

BRIEF DESCRIPTION OF THE DRAWINGS

In order to explain the embodiments of the present application or the technical schemes in the prior art more clearly, the drawings needed in the embodiments will be briefly introduced below. Apparently, the drawings in the following description are only some embodiments of the present application. For one of ordinary skill in the art, other drawings may be obtained according to these drawings without paying creative labor.

DETAILED DESCRIPTION OF THE EMBODIMENTS

In the following, the technical schemes in the embodiments of the present application will be clearly and completely described with reference to the attached drawings. Apparently, the described embodiments are only a part of the embodiments of the present application, but not all the embodiments. Based on the embodiments in the present application, all other embodiments obtained by one of ordinary skill in the art without creative effort belong to the protection scope of the present application.

In order to make the above objects, features and advantages of the present application more obvious and easier to understand, the present application will be further described in detail with the attached drawings and specific embodiments.

Embodiment 1

Figure 1:
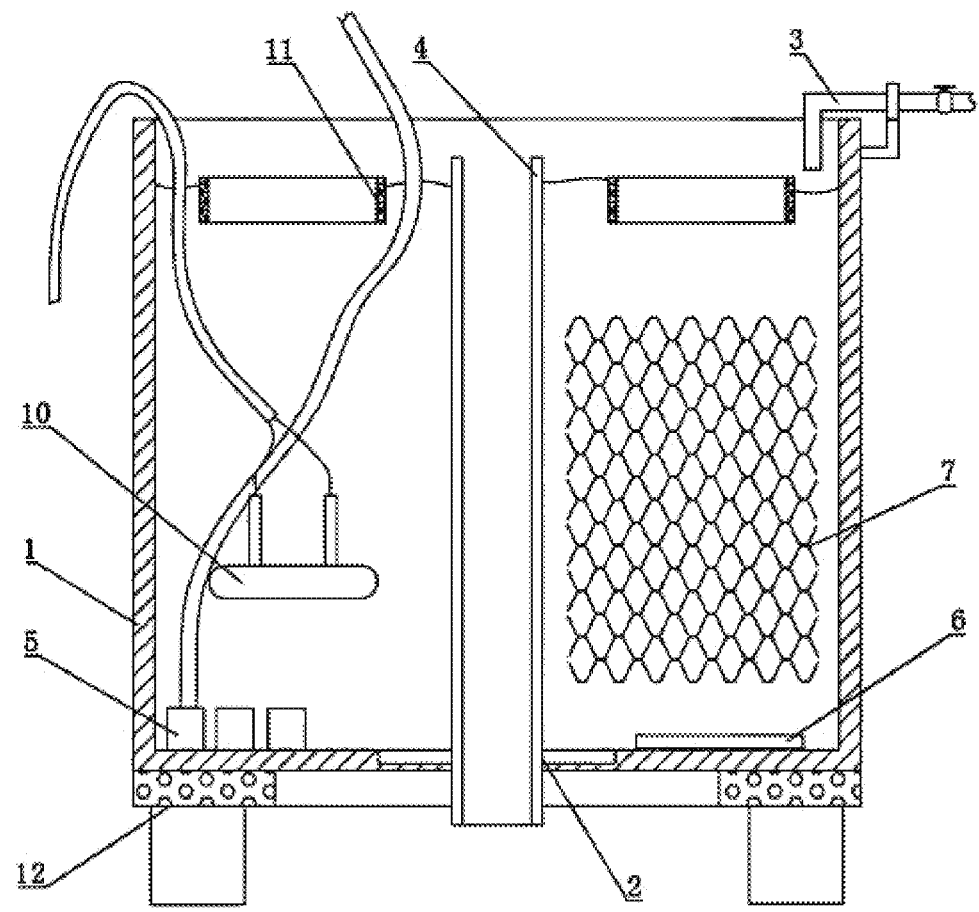
FIG. 1 is a schematic structural diagram of a device for wild *Monopterus albus* domestication of the present application.
Figure 2:
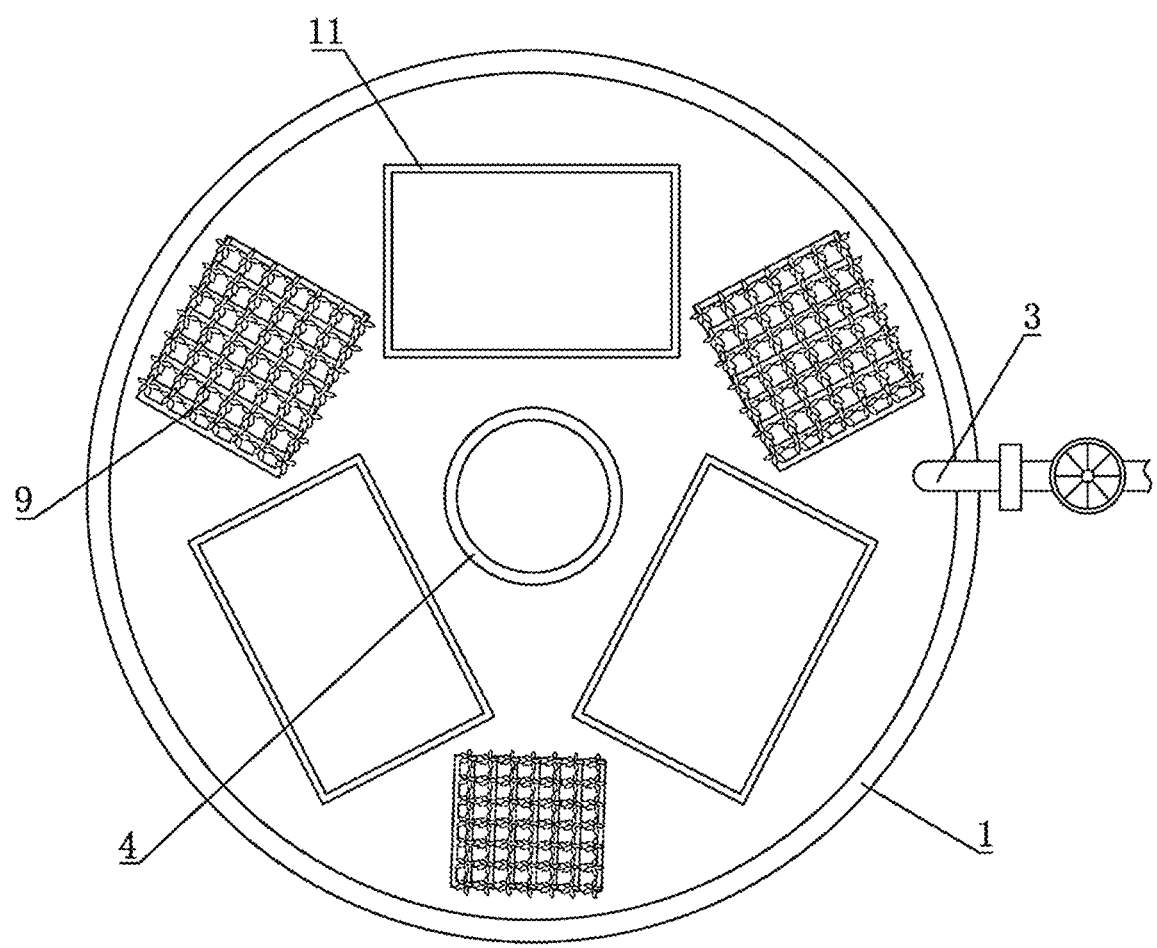
FIG. 2 is a top view of the present application.
Figure 3:
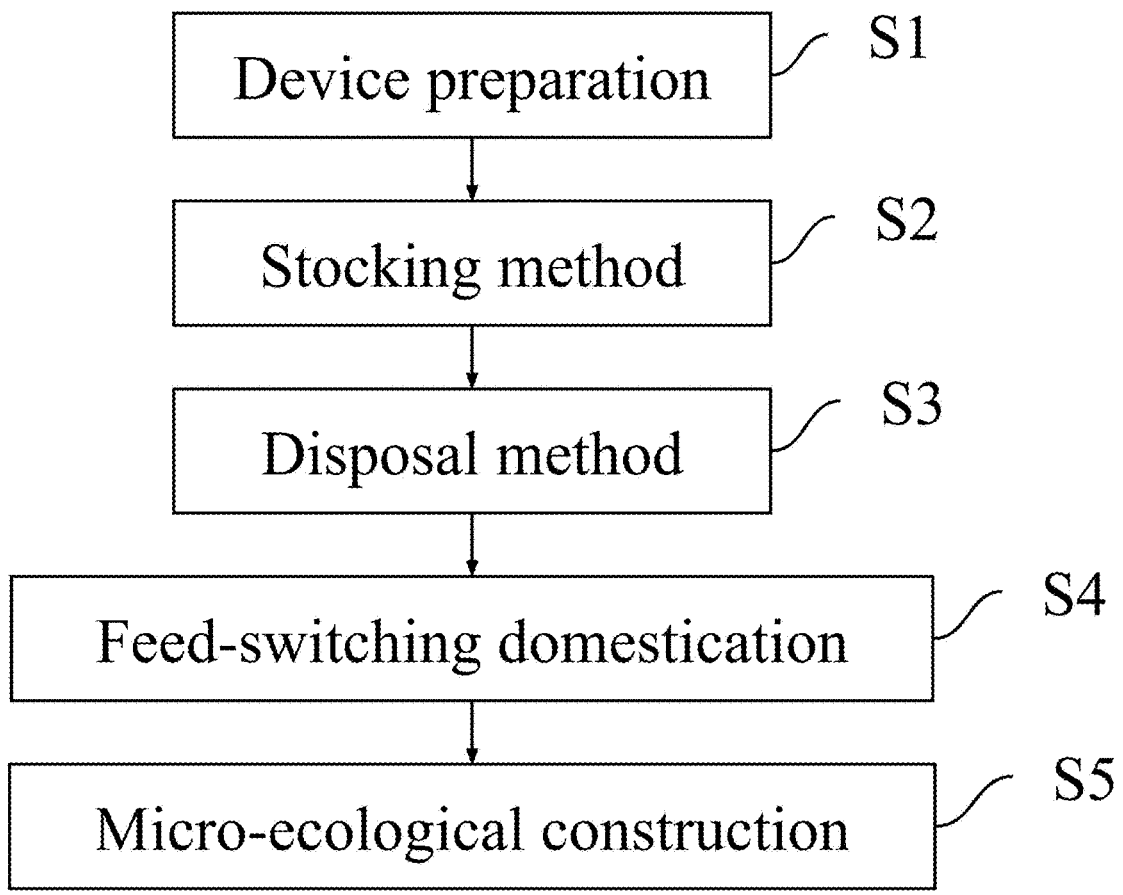
FIG. 3 is a flowchart of a method for wild *Monopterus albus* domestication according to the present disclosure.

Referring to FIG. 1-FIG. 3, the present application provides a device for wild *Monopterus albus* domestication, which includes:

a circular water tank 1, the circular water tank 1 is placed on a bracket 12, a groove is arranged in the circular water tank 1, a drainpipe 2 is arranged in the groove, a plug 4 is detachably connected to the drainpipe 2, the plug 4 extends out of the circular water tank 1, the plug 4 passes through the bracket 12, a water inlet pipe 3 is fixedly connected to the circular water tank 1, a valve is installed on the water inlet pipe 3, a water grass fixing frame 11 is placed in the circular water tank 1, a material table 9 is arranged in the circular water tank 1, a water quality monitoring instrument 10 is placed in the circular water tank 1, multiple bubble stones 5 and a heating rod 6 are placed in the circular water tank 1, a hose is communicated with the bubble stones 5, an aerator is communicated with one end of the hose far away from the bubble stones 5, and an imitating ecological *Monopterus albus* nest 7 and multiple volcanic rocks are placed in the circular water tank 1.

The bracket 12 is used to support the circular water tank 1, the drainpipe 2 is used to drain the water in the circular water tank 1, the plug 4 is used to block the drainpipe 2, the plug 4 is tubular, and the tubular plug 4 may control the water level in the circular water tank 1. When the water level in the circular water tank 1 is too high, the water will flow out through the tubular plug 4 to adjust the water level, the water inlet pipe 3 is used to add water to the circular water tank 1, and the water grass fixing frame 11 is used to fix the *Pistia stratiotes* L. The material table 9 is used for feeding the earthworm. When feeding, the earthworm is placed on the material table 9, and the water quality monitoring instrument 10 is put into the water through the cable. The strength of the cable meets the use requirements. The water quality monitoring instrument 10 is provided with a dissolved oxygen measuring electrode, a temperature measuring electrode and a pH measuring electrode, and the aerator (not shown in the figure) blows air into the water through a hose to increase oxygen in the water, so there are multiple imitating ecological *Monopterus albus* nests 7.

In this embodiment, the groove has a diameter of 200 mm, a depth of 25 mm, a drainpipe diameter of 63 mm, a volcanic rock diameter of 15 mm and a height of 40 mm, and there is a large through hole in the middle of the bracket 12.

To further optimize the scheme, the imitating ecological *Monopterus albus* nest 7 is a PVC material wave-shaped horizontal stripe square piece.

The imitating ecological *Monopterus albus* nest 7 is composed of multiple wave-shaped horizontal stripe square pieces connected together. The dimensions of the PVC material wave-shaped horizontal stripe square piece are: length×width=800 mm×600 mm, and a single imitating ecological *Monopterus albus* nest 7 has five layers and a height of 400 mm.

A use method for the device for wild *Monopterus albus* domestication includes the following steps:

S1, device preparation: firstly, all parts of the domestication device are assembled, the domestication device is disinfected by potassium permanganate solution, then the *Pistia stratiotes* L. is transplanted into the water grass fixing frame 11, and the *Pistia stratiotes* L. covers half of the water surface.

S2, stocking method: introducing running water into the circular water tank 1, and keeping a water level at 0.7-0.9 m and pH at 7.0-7.5; adding anti-stress nutrients; according to 50-100 eels/m$^2$ water body, the *Monopterus albus* offspring seeds with specifications of 8-15 g/eels should be stocked, and the *Monopterus albus* offspring seeds should be disease-free, injury-free, with complete mucus and neat specifications, and come from the local area; the *Monopterus albus* offspring seeds should be caught in professional *Monopterus albus* cages within 48 hours and tested for epidemic diseases, without long-term storage, transportation, electric shock, or drug anesthesia; when the offspring seeds are released, the *Monopterus albus* offspring seeds are placed in a special frame beside the circular water tank 1 for 5 minutes, then the offspring seeds are soaked in the circular water tank 1 for 3 times, lasting for 15 seconds, 20 seconds and 60 seconds respectively, and finally the offspring seeds are poured into water.

S3, disposal method: after pouring the *Monopterus albus* offspring seeds into the water in the circular water tank 1 for 3 days, observing the death of the *Monopterus albus* offspring seeds, picking out the dead offspring seeds, turning on the heating rod 6, raising the temperature slowly, and the temperature is stopped for 1 hour every 2° C. rise until the temperature is raised to 32° C. for 7 days; on the fourth day after the offspring seeds are released, the earthworm is fed according to 1.5-3% of the weight of the *Monopterus albus* offspring seeds, once a day and at night every time, and the earthworm is placed on the material table 9 when feeding; feeding fresh earthworm on the fourth to sixth day after offspring seeds are released, and feeding chopped fresh earthworm on the seventh to tenth day; insect repellent and bactericidal drugs are put on the twelfth day after offspring seeds are released for three days.

S4, feed-switching domestication: feed-switching domestication is started on the thirteenth day after the offspring seeds are released, and chopped mixed commercial feed of earthworm is used to form a domestication material for domestication, and the domestication lasts for 10 days.

S5, micro-ecological construction: after domestication, 1.5 kg of clean and fresh snails and 1.5 kg of shellfish are put into the circular water tank 1, and 0.2 g/L of *Bacillus* is used regularly.

To further optimize the scheme, the circular water tank 1 is made of glass fiber reinforced plastic or food-grade PVC, with a diameter of 2 m and a depth of 1 m, a smooth inner wall and a black color.

To further optimize the scheme, the mass fraction of the potassium permanganate solution in the S1 is 15-25%, and the volume of the circular water tank 1 is 3.14 m$^3$.

To further optimize the scheme, in the S1, 5-8 stems and leaves of the *Pistia stratiotes* L. are tender green, the root system is intact, there is no insect, and there is no withering and yellow.

To further optimize the scheme, the formula of the anti-stress nutrients in the S2 is: 3-5 g of sucrose, 1-5 g of vitamin C, 2-3 g of houttuynia cordata and 3-5 g of licorice per liter of water.

To further optimize the scheme, the detection of epidemic diseases in the S2 includes the detection of pathogenic microorganisms, and the detection method adopts randomly selecting the microorganisms on the surface of the *Monopterus albus* offspring seeds, the environment and the means of transportation, and carrying out microbial culture and sequencing judgment.

To further optimize the scheme, the dosage of the insect repellent and bactericidal drugs in the S3 is 0.05-1 g of neem leaves and 0.01-0.02 g of dried pomegranate peel per liter of water.

To further optimize the scheme, the preparation method of the domestication material described in the S4 includes the following steps: mixing and pulverizing the chopped earthworm into powder commercial material, adding water, stirring into dough coagulated but not dispersed, and adding taurine according to 0.2-0.8% of the weight of the domestication material; and the weight ratio of the earthworm to the commercial material is 4:1, 2:1, 1:1, 1:2, 1:4 and 0:5 in sequence, and is adjusted every two days.

Compared with the prior art, the application has the following advantages.

1. In the application, a self-made domestication device is adopted, and the key technical parameters such as the sources, stocking specifications, stocking density, micro-ecological construction, disposal methods and so on of the *Monopterus albus* offspring seeds are specified in the use method for the device for wild *Monopterus albus* domestication, so as to improve the domestication survival rate of the wild *Monopterus albus*, reduce the offspring seeds cost and realize an indoor industrial breeding of the *Monopterus albus*.

2. The domestication device of the present application has been improved in terms of material, mobility, cost, structure, application scope, etc. and the advantages are: firstly, domestication may be realized in batches at the same time, and the device may be moved to improve efficiency; second, the comprehensive use of *Pistia stratiotes* L., snails, shellfish and beneficial bacteria to create micro-ecology and reduce the cost of water treatment; the third is to prepare nutrients, Chinese herbal medicines for sterilization and insect repellent, and additives in domestication materials to reduce a stress response and an injury rate of the *Monopterus albus* offspring seeds.

Embodiment 2

Referring to FIG. 1-FIG. 3, a use method for the device for wild *Monopterus albus* domestication includes the following steps:

S1, device preparation: firstly, assembling all parts of the domestication device, then disinfecting the domestication device with 15% potassium permanganate solution by mass, and then transplanting the *Pistia stratiotes* L. of each plant with 5 stems and leaves, complete roots, no insects and no yellowing into the device, with a large ladle covering ½ of the water surface; the circular water tank is 2 m in diameter, 1 m in height and 3.14 m³ in volume. The circular water tank is made of glass fiber reinforced plastic with smooth inner wall and black color.

S2, stocking method: introducing running water into the domestication device, and keeping the water level at 0.7 m and the pH at 7.5; adding anti-stress nutrients, and the nutrient formula is: 3 g of sucrose, 1 g of vitamin C, 2 g of houttuynia cordata and 5 g of licorice per liter of water; according to the specifications of 8 g/eel in 50 eels/m² water body, the *Monopterus albus* offspring seeds should be disease-free, injury-free, with complete mucus and neat specifications, and come from the local area; the *Monopterus albus* offspring seeds should be caught in professional *Monopterus albus* cages within 48 hours and tested for epidemic diseases, without long-term storage, transportation, electric shock, or drug anesthesia; when the offspring seeds are released, the *Monopterus albus* offspring seeds are placed in a special frame (a special frame for storing the *Monopterus albus*, as a common tool) beside the circular water tank for 5 minutes, then the offspring seeds are soaked in the circular water tank for 3 times, lasting for 15 seconds, 20 seconds and 60 seconds respectively, and finally the offspring seeds are poured into water.

S3, disposal method: after pouring the *Monopterus albus* offspring seeds into the water in the circular water tank for 3 days, observing the death of the *Monopterus albus* offspring seeds, picking out the dead offspring seeds, turning on the heating rod, raising the temperature slowly, and the temperature is stopped for 1 hour every 2° C. rise until the temperature is raised to 32° C. for 7 days; on the fourth day after the offspring seeds are released, the earthworm is fed according to 1.5% of the weight of the *Monopterus albus* offspring seeds, once a day and at night every time, and the earthworm is placed on the material table when feeding; feeding fresh earthworm on the fourth to sixth day after offspring seeds are released, and feeding chopped fresh earthworm on the seventh to tenth day; insect repellent and bactericidal drugs are put on the twelfth day after offspring seeds are released, and the dosage of the insect repellent and bactericidal drugs is 0.05 g of neem leaves and 0.01 g of dried pomegranate peel per liter of water for 3 days.

S4, feed-switching domestication: feed-switching domestication is started on the thirteenth day after the offspring seeds are released, and chopped mixed commercial feed of earthworm is used to form a domestication material for domestication, and the domestication lasts for 10 days. The preparation method of the domestication material includes the following steps: mixing and pulverizing the chopped earthworm into powder commercial material, adding water, stirring into dough coagulated but not dispersed, and adding taurine according to 0.2% of the weight of the domestication material; and the weight ratio of the earthworm to the commercial material is 4:1, 2:1, 1:1, 1:2, 1:4 and 0:5 in sequence, and is adjusted every two days.

S5, micro-ecological construction: after domestication, 1.5 kg of clean and fresh snails and 1.5 kg of shellfish are put into the circular water tank, and 0.2 g/L of *Bacillus* is used regularly.

Experiment 1: effects of different nutrients on mortality and morbidity of the wild *Monopterus albus* offspring seeds domestication ① Nutrient preparation First nutrient: 3 g of sucrose, 1 g of vitamin C, 2 g of houttuynia cordata and 3 g of licorice.

Second nutrient: 5 g of sucrose, 1 g of vitamin C, 2 g of houttuynia cordata and 3 g of licorice.

Third nutrient: 3 g of sucrose, 5 g of vitamin C, 2 g of houttuynia cordata and 3 g of licorice.

Fourth nutrient: 5 g of sucrose, 5 g of vitamin C, 2 g of houttuynia cordata and 3 g of licorice.

Fifth nutrient: 3 g of sucrose, 1 g of vitamin C, 3 g of houttuynia cordata and 3 g of licorice.

Sixth nutrient: 3 g of sucrose, 1 g of vitamin C, 3 g of houttuynia cordata and 5 g of licorice.

Seventh nutrient: 3 g of sucrose, 1 g of vitamin C, 2 g of houttuynia cordata and 5 g of licorice.

Eighth nutrient: 3 g of sucrose, 5 g of vitamin C, 3 g of houttuynia cordata and 3 g of licorice.

Ninth nutrient: 3 g of sucrose, 5 g of vitamin C, 3 g of houttuynia cordata and 5 g of licorice.

Tenth nutrient: 5 g of sucrose, 5 g of vitamin C, 3 g of houttuynia cordata and 5 g of licorice.

Eleventh nutrient: 5 g of sucrose, 5 g of vitamin C, 3 g of houttuynia cordata and 3 g of licorice.

Twelfth nutrient: 5 g of sucrose, 1 g of vitamin C, 2 g of houttuynia cordata and 5 g of licorice.

Thirteenth nutrient: 5 g of sucrose, 1 g of vitamin C, 3 g of houttuynia cordata and 5 g of licorice.

Fourteenth nutrient: 5 g of sucrose, 1 g of vitamin C, 3 g of houttuynia cordata and 3 g of licorice.

② Two replicates are set for each group of nutrients, and the wild *Monopterus albus* offspring seeds from the same source, the same quantity and the same treatment are stocked in each group, and the feeding management is the same. Other treatment methods are the same as the S1 and the S2 in the Embodiment 1, and the S3-S5 are not carried out for the time being.

③ After three days' temporary breeding, the mortality and morbidity are statistically compared.

TABLE 1

Effects of Different Nutrients on Mortality and Morbidity of the Wild *Monopterus Albus* Offspring Seeds

| Nutrients | Mortality (%) | Morbidity (%) |
| --- | --- | --- |
| First nutrient | 7.1 | 11.1 |
|  | 6.7 | 10.6 |
| Second nutrient | 6.8 | 9.5 |
|  | 6.9 | 10.1 |
| Third nutrient | 5.3 | 9.9 |
|  | 5.0 | 10.3 |
| Fourth nutrient | 5.5 | 9.4 |
|  | 4.9 | 10.2 |
| Fifth nutrient | 4.7 | 8.9 |
|  | 4.6 | 9.4 |
| Sixth nutrient | 5.2 | 8.6 |
|  | 5.4 | 8.9 |
| Seventh nutrient | 5.9 | 8.3 |
|  | 5.7 | 8.5 |
| Eighth nutrient | 5.6 | 8.0 |
|  | 5.2 | 8.2 |
| Ninth nutrient | 5.5 | 9.0 |
|  | 5.0 | 8.6 |
| Tenth nutrient | 5.9 | 9.2 |
|  | 6.0 | 9.4 |
| Eleventh nutrient | 5.7 | 9.1 |
|  | 5.3 | 9.0 |

TABLE 1-continued

Effects of Different Nutrients on Mortality and Morbidity
of the Wild *Monopterus Albus* Offspring Seeds

| Nutrients | Mortality (%) | Morbidity (%) |
|---|---|---|
| Twelfth nutrient | 5.5 | 8.9 |
|  | 5.4 | 9.2 |
| Thirteenth nutrient | 5.2 | 9.3 |
|  | 5.5 | 8.9 |
| Fourteenth nutrient | 5.8 | 8.7 |
|  | 5.2 | 9.0 |

Using the nutrients adopted in the application, the mortality of the wild *Monopterus albus* in 3-day temporary breeding is 4.6-7.1%, and the morbidity is 8.0-11.1%, which are all lower than the related reports (Shi Zhenning. Experiment of the Wild *Monopterus Albus* Offspring Seeds Cultivation and Domestication [J]. *Scientific Fish Culture*, 2002, (3): 11); by comparing other elements in the same situation, the mortality of different sucrose additions is the same, but the morbidity decreases by 1 percentage point with the increase of sucrose. The morbidity of different vitamin C additions is the same, but with the increase of vitamin C, the mortality decreases by 1.6 percentage points. With the increase of houttuynia cordata, the mortality decreases by 0.5 percentage points, and the morbidity decreases by 0.6 percentage points. With the increase of licorice, the mortality decreases by 0.15 percentage points, and the morbidity increases by 0.2 percentage points. The experimental result shows that sucrose and vitamin C have obvious anti-stress effects, while houttuynia cordata and licorice have obvious preventive and therapeutic effects.

Experiment 2: effects of different domestication devices on the weight gain rate, mortality and morbidity of the wild *Monopterus albus* offspring seeds Experimental group:

a use method for the device for wild *Monopterus albus* domestication includes the following steps:

S1, device preparation: firstly, assembling all parts of the domestication device, then disinfecting the domestication device with 15% potassium permanganate solution by mass, and then transplanting the *Pistia stratiotes* L. of each plant with 5 stems and leaves, complete roots, no insects and no yellowing into the device, with a large ladle covering ½ of the water surface; the circular water tank is 2 m in diameter, 1 m in height and 3.14 m³ in volume. The circular water tank is made of glass fiber reinforced plastic with smooth inner wall and black color.

S2, stocking method: introducing running water into the domestication device, and keeping the water level at 0.7 m and the pH at 7.5; adding anti-stress nutrients, and the nutrient formula is: 3 g of sucrose, 1 g of vitamin C, 2 g of houttuynia cordata and 5 g of licorice per liter of water; according to the specifications of 8 g/eel in 50 eels/m² water body, the *Monopterus albus* offspring seeds should be disease-free, injury-free, with complete mucus and neat specifications, and come from the local area; the *Monopterus albus* offspring seeds should be caught in professional *Monopterus albus* cages within 48 hours and tested for epidemic diseases, without long-term storage, transportation, electric shock, or drug anesthesia; when the offspring seeds are released, the *Monopterus albus* offspring seeds are placed in a special frame beside the circular water tank for 5 minutes, then the offspring seeds are soaked in the circular water tank for 3 times, lasting for 15 seconds, 20 seconds and 60 seconds respectively, and finally the offspring seeds are poured into water.

S3, disposal method: after pouring the *Monopterus albus* offspring seeds into the water in the circular water tank for 3 days, observing the death of the *Monopterus albus* offspring seeds, picking out the dead offspring seeds, turning on the heating rod, raising the temperature slowly, and the temperature is stopped for 1 hour every 2° C. rise until the temperature is raised to 32° C. for 7 days; on the fourth day after the offspring seeds are released, the earthworm is fed according to 3% of the weight of the *Monopterus albus* offspring seeds, once a day and at night every time, and the earthworm is placed on the material table when feeding; feeding fresh earthworm on the fourth to sixth day after offspring seeds are released, and feeding chopped fresh earthworm on the seventh to tenth day; insect repellent and bactericidal drugs are put on the twelfth day after offspring seeds are released, and the dosage of the insect repellent and bactericidal drugs is 0.05 g of neem leaves and 0.01 g of dried pomegranate peel per liter of water for 3 days.

S4, feed-switching domestication: feed-switching domestication is started on the thirteenth day after the offspring seeds are released, and chopped mixed commercial feed of earthworm is used to form a domestication material for domestication, and the domestication lasts for 10 days. The preparation method of the domestication material includes the following steps: mixing and pulverizing the chopped earthworm into powder commercial material, adding water, stirring into dough coagulated but not dispersed, and adding taurine according to 0.2% of the weight of the domestication material; and the weight ratio of the earthworm to the commercial material is 4:1, 2:1, 1:1, 1:2, 1:4 and 0:5 in sequence, and is adjusted every two days.

S5, micro-ecological construction: after domestication, 1.5 kg of clean and fresh snails and 1.5 kg of shellfish are put into the circular water tank, and 0.2 g/L of *Bacillus* is used regularly.

Control group: according to the method reported by Shi Zhenning (Shi Zhenning.

Experiment of the Wild *Monopterus Albus* Offspring Seeds Cultivation and Domestication [J]. *Scientific Fish Culture*, 2002, (3): 11).

TABLE 2

Effects of Different Domestication Devices on the
Weight Gain Rate, Mortality and Morbidity
of the Wild *Monopterus Albus* Offspring Seeds

| Groups | Weight gain rate (%) | Mortality (%) | Morbidity (%) |
|---|---|---|---|
| Experimental group | 37.2 | 5.5 | 8.6 |
| Control group | 21.1 | 37 | — |

Through experiments, compared with the method reported by Shi Zhenning (2002), the mortality of the wild *Monopterus albus* domestication is significantly reduced; at the same time, the application has high integration and small occupied space.

In the description of the present application, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the accompanying drawings, only for the convenience of describing the present application, and do not indicate or imply that the device or element referred to must have a specific orientation, be constructed and operated in a specific orientation, and therefore cannot be understood as a limitation of the present application.

The above-mentioned embodiments only describe the preferred mode of the present application, and do not limit the scope of the present application. Under the premise of not departing from the design spirit of the present application, various modifications and improvements made by ordinary technicians in the field to the technical schemes of the present application should fall within the protection scope of the present application.

What is claimed is:

1. A method for wild *Monopterus albus* domestication, wherein the method adopts a device for wild *Monopterus albus* domestication, and the device comprises:
   a circular water tank, wherein the circular water tank is placed on a bracket, a groove is arranged in the circular water tank, a drainpipe is arranged in the groove, a plug is detachably connected to the drainpipe, the plug extends out of the circular water tank, the plug passes through the bracket, a water inlet pipe is fixedly connected to the circular water tank, a valve is installed on the water inlet pipe, a water grass fixing frame is placed in the circular water tank, a material table is arranged in the circular water tank, a water quality monitoring instrument is placed in the circular water tank, a plurality of bubble stones and a heating rod are placed in the circular water tank, a hose is communicated with the bubble stones, an aerator is communicated with one end of the hose far away from the bubble stones, and an imitating ecological *Monopterus albus* nest and a plurality of volcanic rocks are placed in the circular water tank; and
   the imitating ecological *Monopterus albus* nest is a PVC material wave-shaped horizontal stripe square piece;
   the method comprises following steps:
   S1, device preparation: firstly, all parts of the domestication device are assembled, the domestication device is disinfected by potassium permanganate solution, then a *Pistia stratiotes* L. is transplanted into the water grass fixing frame, and the *Pistia stratiotes* L. covers half of the water surface;
   S2, stocking method: introducing running water into the circular water tank, and keeping a water level at 0.7-0.9 m and pH at 7.0-7.5; adding anti-stress nutrients; according to 50-100 eels/m² water body, *Monopterus albus* offspring seeds with specifications of 8-15 g/eels should be stocked, and the *Monopterus albus* offspring seeds should be disease-free, injury-free, with complete mucus and neat specifications, and come from a local area; the *Monopterus albus* offspring seeds should be caught in professional *Monopterus albus* cages within 48 hours and tested for epidemic diseases, without long-term storage, transportation, electric shock, or drug anesthesia; when the offspring seeds are released, the *Monopterus albus* offspring seeds are placed in a special frame beside the circular water tank and let stand for 5 minutes, then the offspring seeds are soaked in the circular water tank for 3 times, lasting for 15 seconds, 20 seconds and 60 seconds respectively, and finally the offspring seeds are poured into water;
   S3, disposal method: after pouring the *Monopterus albus* offspring seeds into the water in the circular water tank for 3 days, observing the death of the *Monopterus albus* offspring seeds, picking out the dead offspring seeds, turning on the heating rod, raising the temperature slowly, and the temperature is stopped for 1 hour every 2° C. rise until the temperature is raised to 32° C. for 7 days; on the fourth day after the offspring seeds are released, earthworm is fed according to 1.5-3% of the weight of the *Monopterus albus* offspring seeds, once a day and at night every time, and the earthworm is placed on the material table when feeding; feeding fresh earthworm on the fourth to sixth day after offspring seeds are released, and feeding chopped fresh earthworm on the seventh to tenth day; insect repellent and bactericidal drugs are put on the twelfth day after offspring seeds are released for three days;
   S4, feed-switching domestication: feed-switching domestication is started on the thirteenth day after the offspring seeds are released, and chopped mixed commercial feed of earthworm is used to form a domestication material for domestication, and the domestication lasts for 10 days; and
   S5, micro-ecological construction: after domestication, 1.5 kg of clean and fresh snails and 1.5 kg of shellfish are put into the circular water tank, and 0.2 g/L of *Bacillus* is used regularly; the circular water tank is made of glass fiber reinforced plastic or food-grade PVC, with a diameter of 2 m and a depth of 1 m, a smooth inner wall and a black color;
   wherein the mass fraction of the potassium permanganate solution in the S1 is 15-25%, and the volume of the circular water tank is 3.14 m³;
   in the S1, 5-8 stems and leaves of the *Pistia stratiotes* L. are tender green, the root system is intact, there is no insect, and there is no withering and yellow;
   the formula of the anti-stress nutrients in the S2 is: 3-5 g of sucrose, 1-5 g of vitamin C, 2-3 g of houttuynia cordata and 3-5 g of licorice per liter of water;
   a detection of epidemic diseases in the S2 comprises the detection of pathogenic microorganisms, and the detection method adopts randomly selecting the microorganisms on the surface of the *Monopterus albus* offspring seeds, the environment and transportation equipment, and carrying out microbial culture and sequencing judgment;
   dosage of the insect repellent and bactericidal drugs in the S3 is 0.05-1 g of neem leaves and 0.01-0.02 g of dried pomegranate peel per liter of water; and
   a preparation method of the domestication material described in the S4 comprises the following steps: mixing and pulverizing the chopped earthworm into powder commercial material, adding water, stirring into dough coagulated but not dispersed, and adding taurine according to 0.2-0.8% of the weight of the domestication material; and the weight ratio of the earthworm to the commercial material is 4:1, 2:1, 1:1, 1:2, 1:4 and 0:5 in sequence, and is adjusted every two days.

* * * * *